US008378842B2

(12) United States Patent
Hall et al.

(10) Patent No.: US 8,378,842 B2
(45) Date of Patent: Feb. 19, 2013

(54) DOWNHOLE COMPONENT WITH AN ELECTRICAL DEVICE IN A BLIND-HOLE

(75) Inventors: David R. Hall, Provo, UT (US); Jim Shumway, Lehi, UT (US); Brad Barger, Provo, UT (US)

(73) Assignee: Schlumberger Technology Corporation, Houston, TX (US)

( * ) Notice: Subject to any disclaimer, the term of this patent is extended or adjusted under 35 U.S.C. 154(b) by 1280 days.

(21) Appl. No.: 12/141,996

(22) Filed: Jun. 19, 2008

(65) Prior Publication Data

US 2009/0315791 A1 Dec. 24, 2009

(51) Int. Cl.

| | |
|---|---|
| ***G01V 3/00*** | (2006.01) |
| ***H01Q 1/04*** | (2006.01) |
| ***H01Q 1/36*** | (2006.01) |
| ***E21B 47/00*** | (2012.01) |
| ***E21B 44/00*** | (2006.01) |

(52) U.S. Cl. ............... 340/854.8; 340/854.9; 340/855.1; 340/855.2; 343/719; 343/895; 166/250.11; 175/25; 175/40

(58) Field of Classification Search ............... 340/854.8, 340/854.9, 855.1, 855.2; 343/719, 895; 166/250.01, 166/250.11; 175/24, 40
See application file for complete search history.

(56) References Cited

U.S. PATENT DOCUMENTS 3,960,692 A * 6/1976 Weyl et al. .................... 204/428
4,958,517 A * 9/1990 Maron ....................... 73/152.48
5,386,724 A * 2/1995 Das et al. .................. 73/152.59
5,448,227 A * 9/1995 Orban et al. ............... 340/854.4
5,467,832 A * 11/1995 Orban et al. .................... 175/45
5,469,736 A * 11/1995 Moake ...................... 73/152.58
5,747,743 A 5/1998 Kato
6,281,801 B1 * 8/2001 Cherry et al. ................. 340/605
6,422,336 B1 * 7/2002 Abele et al. ................... 180/446
6,547,016 B2 * 4/2003 Wassell ........................... 175/45
6,603,114 B1 * 8/2003 Holzapfel et al. ....... 250/231.14
6,655,452 B2 * 12/2003 Zillinger ......................... 166/66
6,802,215 B1 * 10/2004 Boucher et al. ............ 73/152.48
6,957,575 B2 * 10/2005 Boucher et al. ............ 73/152.48
6,984,980 B2 * 1/2006 Kruspe et al. ................. 324/303
7,028,543 B2 * 4/2006 Hardage et al. ............ 73/152.01
7,212,173 B2 5/2007 Chen
7,525,315 B2 * 4/2009 Fredette et al. ............... 324/342
7,541,813 B2 * 6/2009 Synder et al. ................. 324/339
7,583,085 B2 * 9/2009 Hall et al. ..................... 324/338
7,598,742 B2 * 10/2009 Synder et al. ................. 324/339
7,722,920 B2 * 5/2010 Mickle et al. ................ 427/96.1
7,884,611 B1 * 2/2011 Hall et al. ..................... 324/339
7,888,940 B2 * 2/2011 Hall et al. ..................... 324/339
7,898,259 B2 * 3/2011 Hall et al. ..................... 324/339
7,948,239 B1 * 5/2011 Hall et al. ..................... 324/339
7,982,463 B2 * 7/2011 Snyder et al. ................. 324/339
7,994,791 B2 * 8/2011 Hall et al. ..................... 324/339
8,030,936 B2 * 10/2011 Hall et al. ..................... 324/339
8,072,221 B2 * 12/2011 Snyder et al. ................. 324/339
2003/0151408 A1 * 8/2003 Kruspe et al. ................. 324/303
2005/0045343 A1 * 3/2005 Bixenman et al. ............ 166/385
(Continued)

*Primary Examiner* — Jennifer H Gay
(74) *Attorney, Agent, or Firm* — Brinks Hofer Gilson & Lione

(57) ABSTRACT

A downhole tool string component has a through-bore intermediate first and second tool joints adapted for connection to adjacent tool string components. A blind-hole is formed in an outer surface of the component. A processing unit is also disposed within an outer surface of the component. An electrical device that is disposed within the component is in communication with the processing unit through an electrically or optically conductive medium which has a self-aligning pattern.

8 Claims, 11 Drawing Sheets

U.S. PATENT DOCUMENTS

2006/0267200 A1* 11/2006 Mickle et al. ................. 257/754
2009/0025982 A1* 1/2009 Hall et al. ....................... 175/76
2009/0315791 A1* 12/2009 Hall et al. ..................... 343/719
2010/0155137 A1* 6/2010 Hall et al. ....................... 175/41
2010/0260494 A1* 10/2010 Sutton et al. .................. 396/268

* cited by examiner

DOWNHOLE COMPONENT WITH AN ELECTRICAL DEVICE IN A BLIND-HOLE

BACKGROUND

Embodiments of the present invention are related to gaining access to data from a drill string, especially for oil, gas, and geothermal well exploration and production, and more particularly to an electrical connection for use in downhole drilling string components. Information related to drilling such as temperature, pressure, inclination, salinity, etc. is of great value when obtained during drilling and may save time and money.

U.S. Pat. No. 5,747,743 to Kato et al., which is herein incorporated by reference for all that it contains, discloses a coil-shaped flexible printed circuit board which retains its original outer diameter unchanged without any guide or retainer. For this purpose, either the conductive pattern of copper or synthetic base material is processed to have a permanent stretch before or when the board is wound into a coil shape. A squeezing step may be employed to generate the permanent stretch on the conductive pattern. Alternatively, a heat treatment of the base material may be used to form an additional bridged ingredient after the board has been wound. The additional bridged ingredient may retain the coil shape unchanged for a long time without guiding pieces.

U.S. Pat. No. 7,212,173 to Chen et al., which is herein incorporated by reference for all that it contains, discloses an invention which refers to an axial antenna structure for use on a borehole wireline or logging while drilling tool. The antenna comprises an insulating medium and an electrical conductor disposed on the insulating medium. The electrical conductor is situated to have a magnetic dipole moment parallel to a longitudinal axis of the borehole logging apparatus. A tri-axial configuration combines the axial coil design and at least one transverse antenna structure substantially co-located with the axial antenna. The transverse antenna structure has a magnetic dipole moment orthogonal to the magnetic dipole moment of the axial antenna.

BRIEF SUMMARY

In one aspect of the present invention, a downhole tool string component has a through-bore intermediate, or between, first and second tool joints adapted for connection to adjacent tool string components. A blind-hole is formed in an outer surface of the component. A processing unit is also disposed within an outer surface of the component. An electrical device that is disposed within the component is in communication with the processing unit through an electrically or optically conductive medium which has a self-aligning pattern.

The self-aligning pattern may have two ends, a first end and a second end. Both ends may start in the approximate center of the pattern. Both ends may start on the periphery of the pattern. One end may start in the approximate center of the pattern and the other end may start on the periphery of the pattern. The electrical device may attach to the approximate center of the pattern. The pattern may contain a spiral, a square spiral, a zigzag, or any other self-aligning pattern. The pattern may also be such that when an electrical device, which is connected to the processing unit through one of the said connections, is being inserted into a blind hole, the outer periphery of the pattern aligns before the approximate center of the pattern.

The blind-hole may have an interior seating surface. The pattern may lay parallel to the seating surface in the blind-hole. The outer surface which contains the blind-hole may be part of the outer diameter of a tubular body forming the through-bore or it might be the outer diameter of a sleeve that is disposed around the tubular body. The sleeve may also comprise a stabilizer blade. The electrical device may be inserted into the blind-hole with a press fit.

The conductive medium may comprise at least one trace disposed within a flexible printed circuit board. The conductive medium may comprise an optically conductive medium disposed within a flexible material. The flexible materials that the conductive mediums are disposed within may contain polyimide or polyester.

DETAILED DESCRIPTION

Figure 1:
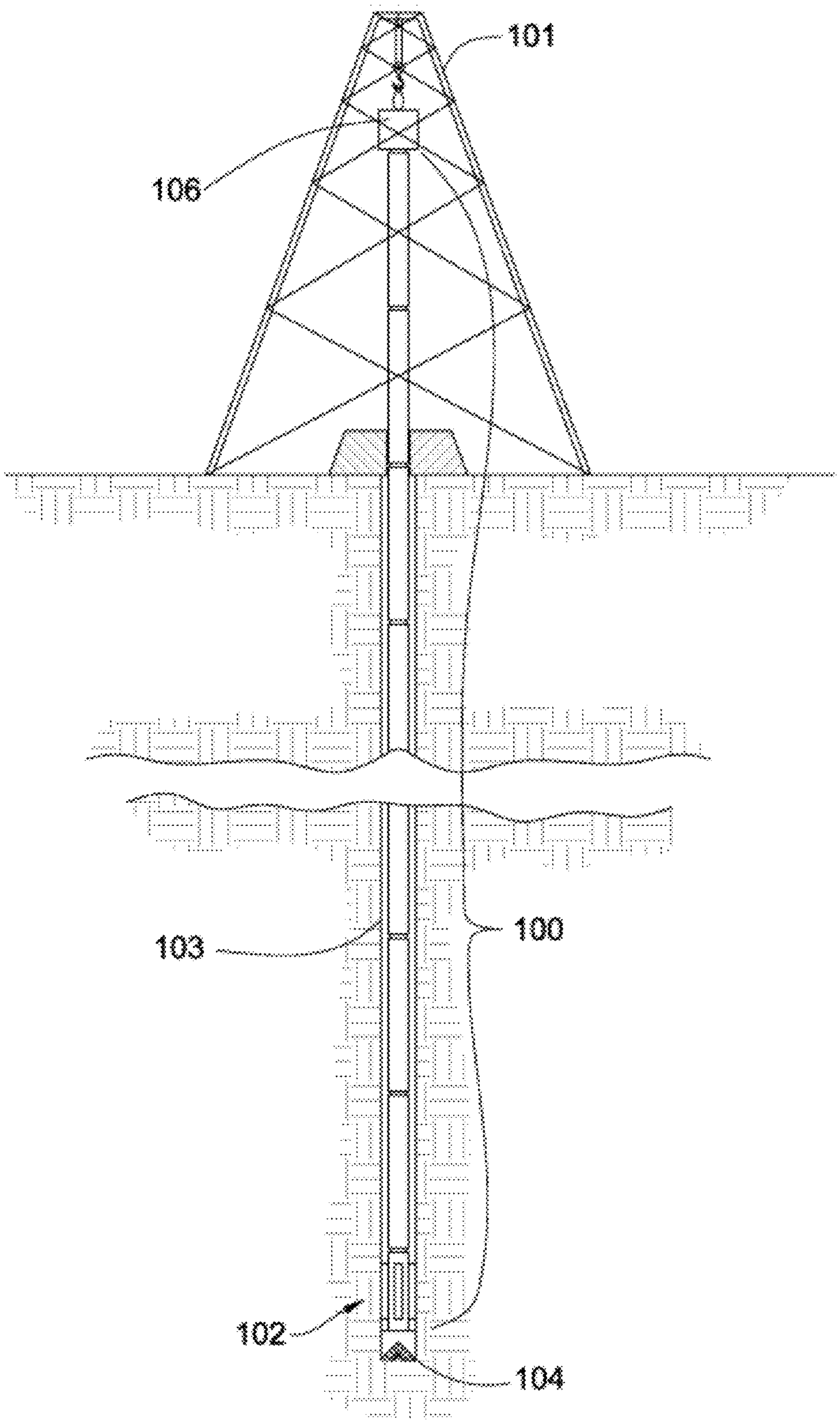
FIG. 1 is a cross-sectional diagram of an embodiment of a downhole tool string.

FIG. 1 is an embodiment of a drill string 100 suspended by a derrick 101. A bottom-hole assembly 102 is located at the bottom of a bore hole 103 and comprises a drill bit 104. As the drill bit 104 rotates downhole, the drill string 100 advances farther into the earth. The drill string 100 may penetrate soft or hard subterranean formations. The bottom-hole assembly 102 and/or downhole components may comprise data acquisition devices which may gather data. The data may be sent to the surface via a transmission system to a data swivel 106. The data swivel 106 may send the data to the surface equipment. Furthermore, the surface equipment may send data and/or power to downhole tools and/or the bottom-hole assembly 102 through the data swivel 106. A preferred data transmission system is disclosed in U.S. Pat. No. 6,670,880 to Hall, which is herein incorporated by reference for all that it discloses.

Figure 2:
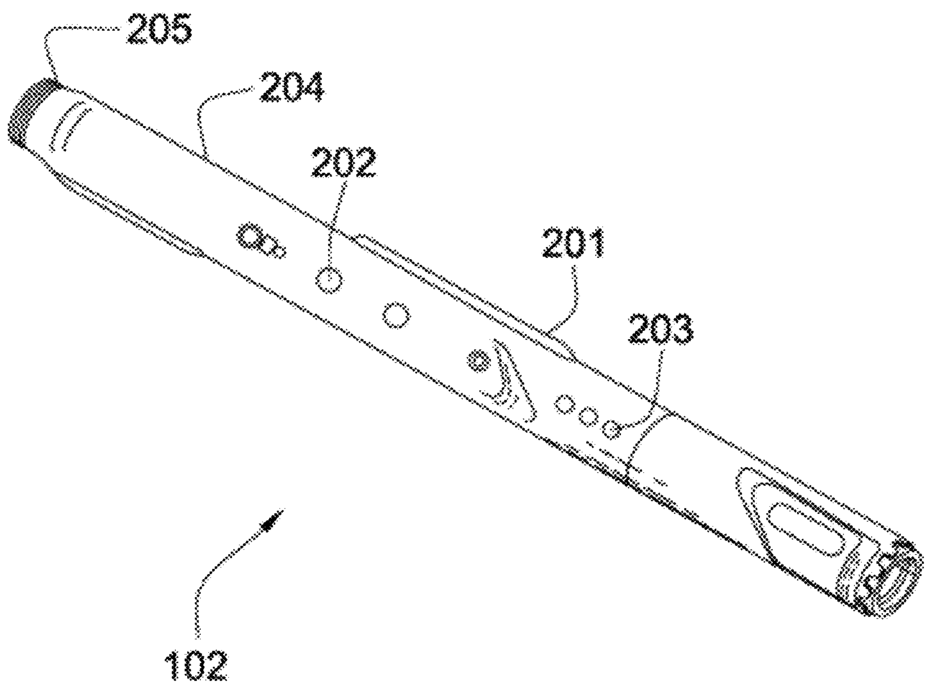
FIG. 2 is a perspective diagram of an embodiment of a sleeve.

FIG. 2 depicts an embodiment of a drill string component 102 having a sleeve 204 disposed around a tubular body 205. The sleeve 204 may have stabilizers 201 with at least one electrical device disposed therein. An example of a stabilizer that may be compatible with the present invention is disclosed in U.S. patent application Ser. No. 11/828,901 by Hall et al. which is herein incorporated by reference for all that it discloses. The sleeve 204 may have blind-holes on either the outer surface of the sleeve, such as blind-hole 203 or in a stabilizer blade of the sleeve, such as blind hole 202. The electrical device may connect to a processing unit disposed within a pocket inside the sleeve 204. An example of a pocket formed in a sleeve that may be compatible with the present invention is disclosed in U.S. patent application Ser. No. 11/688,952 by Hall et al. which is herein incorporated by reference for all that it discloses.

Figure 3:
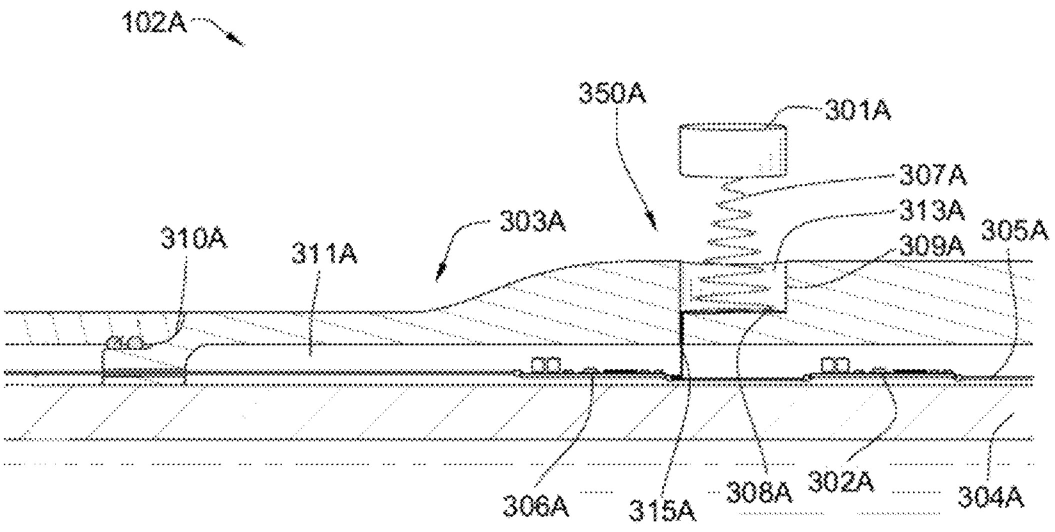
FIG. 3 is a cross sectional diagram of an embodiment of a downhole tool string component having an electrical device connected to a processing unit.

FIG. 3 is a cross-sectional view of an embodiment of a drill string component 102A having a tubular body 304A enclosed by a stabilizer blade 350A formed in a sleeve 303A. The sleeve 303A has a plurality of pockets 311A, 313A formed along the length of the tubular body 304A. Each pocket may contain downhole instrumentation including processing units 306A, 302A linked to a drill string telemetry system 305. The drill string telemetry system 305 may continue down the length of the sleeve 303A passing through joints 310A formed between adjacent sleeves disposed around the tubular body 304A. It is believed that disposing electronic devices 313A in an outer surface of a stabilizer blade 350A may allow the electronic devices to have close contact with the bore hole wall, which may improve their performance.

The stabilizer blade 350A may have the blind-hole 313A formed within it. An electrical device 301A may be in communication with a processing unit 306A disposed within a pocket 311A of the sleeve 303A through a conductive medium 307A having a self-aligning pattern. A channel 315A may exist that connects the blind-hole 313A to the interior pocket 311A. The conductive medium 307A may utilize this channel 315A as a passage between the blind-hole 313A and the pocket 311A.

In the embodiment depicted in FIG. 3, the electronic device 301A may be inserted into the blind-hole 313A through a press fit. It is believed that when the electronic device 301A is press fit into the blind-hole 313A the conductive medium 307A may become caught between the electronic device 301A and a wall 309A of the blind-hole 313A causing the conductive medium 307A to shear or break. Because visual inspection may not be possible once the electronic device 301A in inserted into the blind-hole 313A, a broken connection may not be detected without removing the electronic device 301A; then having to risk damaging the connection again upon reinsertion. When the electronic device 301A is press fit into a blind-hole 313A it is believed that the self-aligning pattern may cause the conductive medium 307A to actively self-align on a seating surface 308A and prevent the conductive medium 307A from being sheared or cut on the wall 309A of the blind-hole 313A.

The self-aligning pattern may also cause the conductive medium 307A to lie in a nearly flat arrangement. It is believed that in situations when the clearance between the seating surface 308A of the blind-hole 313A and the bottom of the electronic device 301A are small, the flat arrangement may prevent the conductive medium 307A from being crushed and broken. The self-aligning pattern may also stretch enough to allow the electronic device 301A to be removed up to a foot away from the blind-hole 313A. This allows the electronic device 301A to be inspected for damage and then reinserted without having to disconnect the electronic device 301A.

The conductive medium 307A may be comprised of a flexible material that allows for stretching and bending. The self-aligning pattern may be a pattern that returns to nearly the same physical arrangement anytime that it not acted upon by an external force. In some embodiments the conductive medium 307A may be formed from a material comprising a polyimide or a polyester. Due to possible higher temperature tolerances, the polyimide material may be better suited for deep downhole applications. The self-aligning patterns may be created using a Computer Numerical Control (CNC) machine. In the case of the optically conductive medium, the conductor may be fiber optics embedded in or on a flexible material such as the above mentioned polyimide.

It is also believed that the use of a self-aligning pattern in the embodiment of a flexible printed circuit board may allow for easier scalability and addition of features in the future. The addition of a certain number of traces to a flexible printed circuit board may take up less physical space than the addition of the same number of discreet wires to a different embodiment that uses wires a conductive medium that does not self-align. The additional physical space requirements of the wires may require further modification be done to the channel 315A connecting the blind-hole 313A and the pocket 311A. The change in physical space requirements for the additional wires may also require more clearance between the seating surface 308A of the blind-hole 313A and the bottom of the electronic device 301A when the electronic device 301A is fully inserted. A flexible printed circuit board may allow multiple layers and multiple traces per layer while maintaining nearly the same overall physical dimensions.

Figure 4:
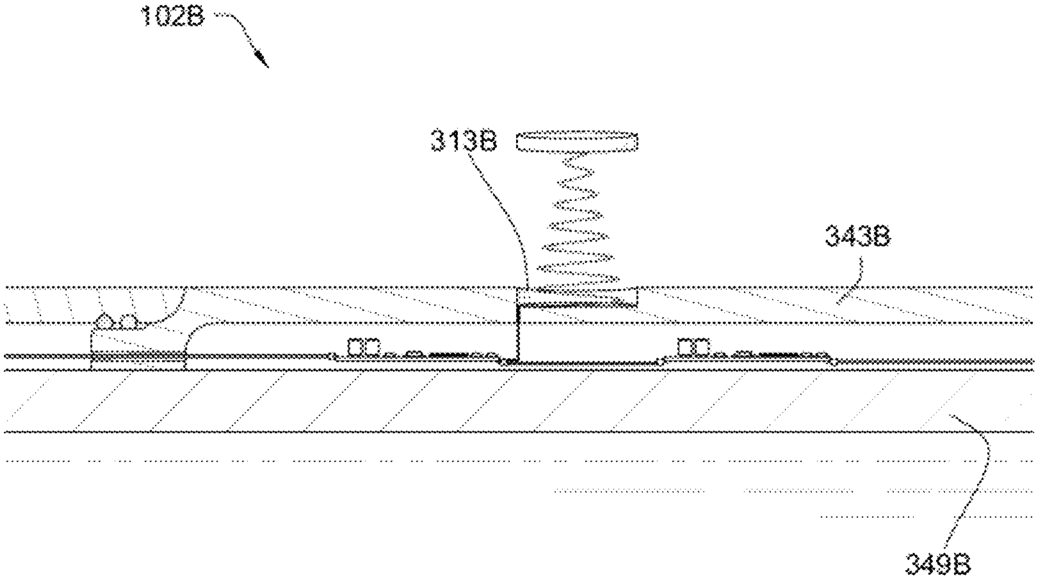
FIG. 4 is a cross sectional diagram of another embodiment of a downhole tool string component having an electrical device connected to a processing unit.

FIG. 4 is a cross-sectional view of another tool string component 102B having an embodiment of a tubular body 349B enclosed in a sleeve 343B where a blind-hole 313B is formed in a thinner portion of the sleeve 343B than in the embodiment of FIG. 3.

Figure 5:
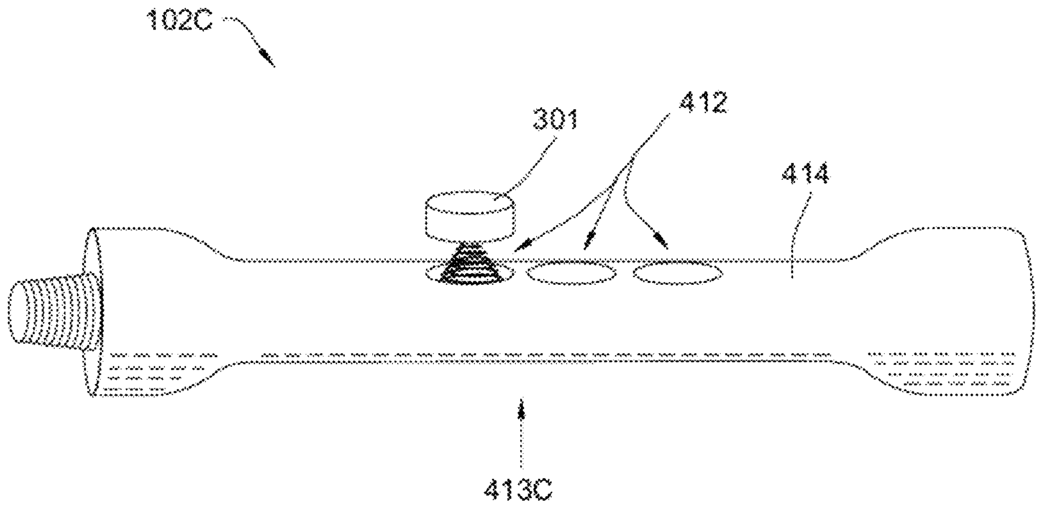
FIG. 5 is a perspective diagram of an embodiment of a tubular body with blind-holes.

FIG. 5 is a perspective view of an embodiment of a tubular body 413C of a tool string component 102C. The depicted tubular body 413C has a plurality of blind-holes 412C formed in an outer surface 414C of the tubular body 413C. An electrical device 301C may be inserted into one of the plurality of blind holes 412C and may be in communication with a processing unit disposed within the tool string component 102C through a conductive medium having a self-aligning pattern.

Figure 6:
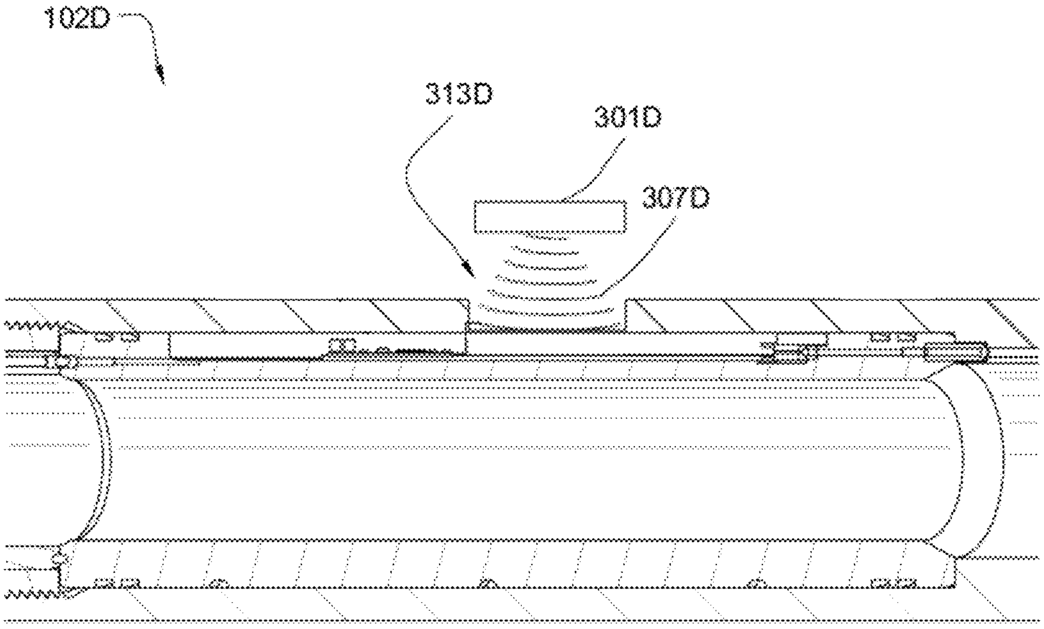
FIG. 6 is cross sectional diagram of an embodiment of a tool string component.

The embodiment of FIG. 6 shows an electrical device 301D in relation to a blind-hole 313D prior to the electrical device 301D being inserted into the blind-hole 313D. A conductive medium 307D has a self-aligning pattern that may control the way that the conductive medium 307D settles in the blind-hole 313D and prevent the conductive medium 307D from catching upon insertion, which could led to shearing or breaking of the conductive medium 307D. An example of an arrangement of electronics disposed within a bore of a downhole tool is disclosed in U.S. Pat. No. 7,193,526 by Hall et al. which is herein incorporated by reference for all that it discloses.

Figure 7:
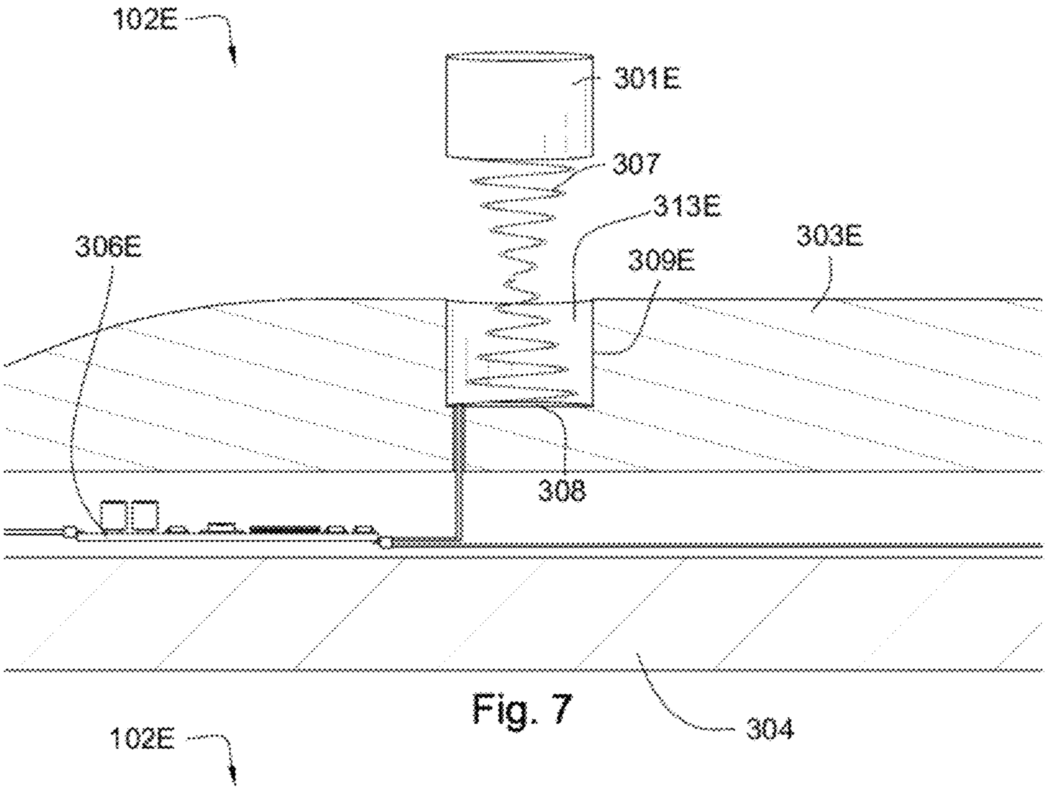
FIG. 7 is a cross sectional diagram of another embodiment of a downhole tool string component having an electrical device connected to a processing unit.

FIG. 7 is a cross-sectional view of a tool string component 102E having an embodiment of an electrical device 301E in communication with a processing unit 306E through a conductive medium 307E having a self-aligning pattern. In the embodiment of FIG. 7, the self-aligning pattern is a spiral with both ends of the spiral terminating on a periphery of the self-aligning pattern. A blind-hole 313E is disposed within the sleeve 303E that encloses a tubular body 304E. When the electrical device 301E is press fit into the blind-hole 313E it is believed that the self-aligning pattern will cause the conductive medium 307E to actively self-align on a seating surface 308E of the blind-hole 313E and prevent the conductive medium 307E from being sheared or cut on the wall 309E of the blind-hole 313E during the press fitting process.

Figure 8:
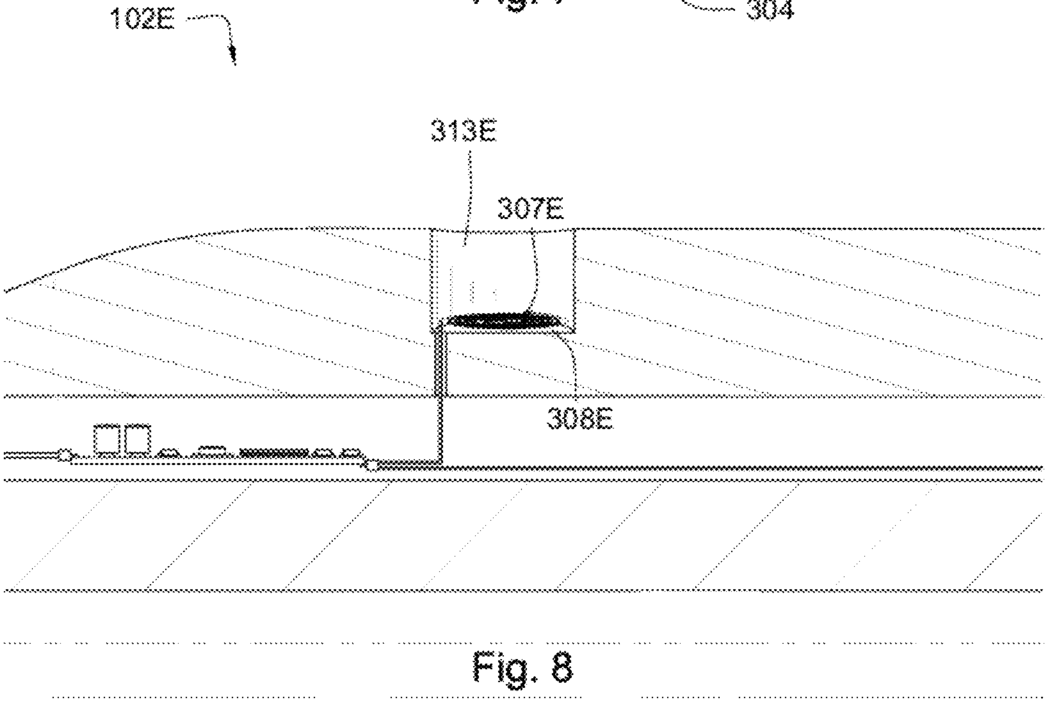
FIG. 8 is a cross sectional diagram of another embodiment of a downhole tool string component having an electrical device connected to a processing unit.

FIG. 8 is a cross sectional view of the embodiment of the tool string component 102E of FIG. 7 illustrating the pattern of the conductive material 307E seated in the bottom of the blind-hole 313E on the seating surface 308E, the electrical device 301 is not shown for illustrative purposes.

Figure 9:
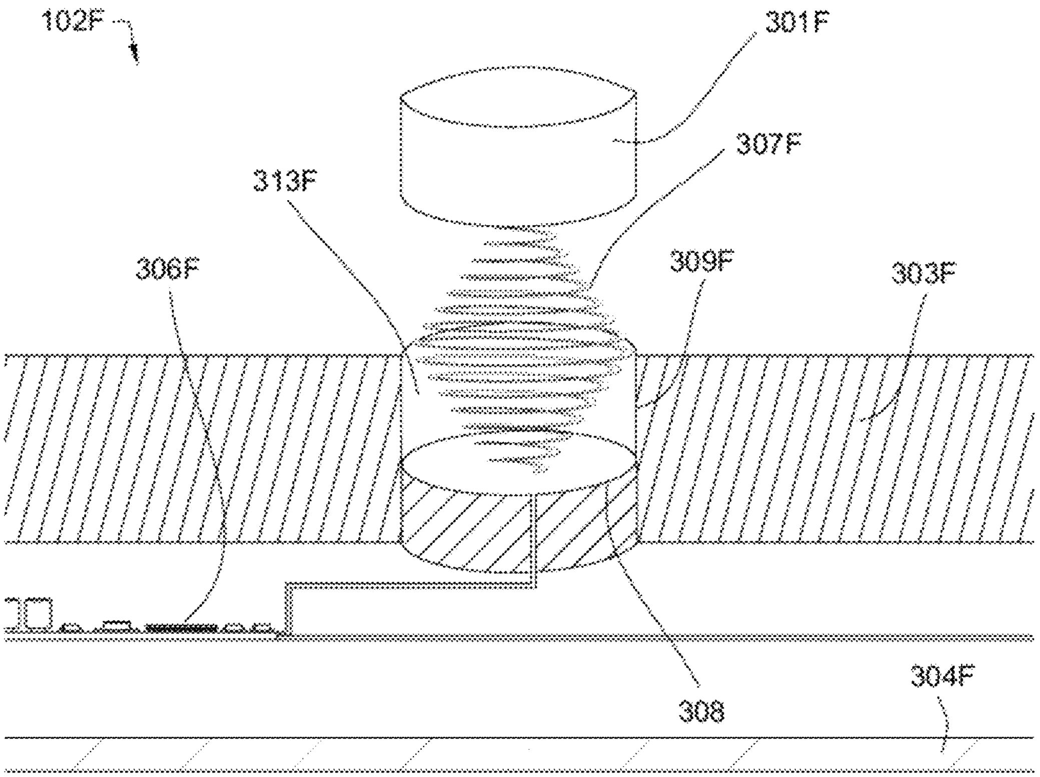
FIG. 9 is a cross sectional diagram of another embodiment of a downhole tool string component having an electrical device connected to a processing unit.

FIG. 9 is a cross-sectional view of a tool string component 102F having an embodiment of an electrical device 301F in communication with a processing unit 306F through a conductive medium 307F having a self-aligning pattern. In the embodiment of FIG. 9, the self-aligning pattern is a spiral with both ends of the spiral terminating in the approximate center of the self-aligning pattern. A blind-hole 313F is disposed within a sleeve 303F that encloses a tubular body 304F. When the electrical device 301F is press fit into the blind-hole 313F it is believed that the self-aligning pattern will cause the conductive medium 307F to actively self-align on a seating surface 308F of the blind-hole 313F and prevent the conductive medium 307F from being sheared or cut on a wall 309F of the blind-hole 313F during the press fitting process.

Figure 10:
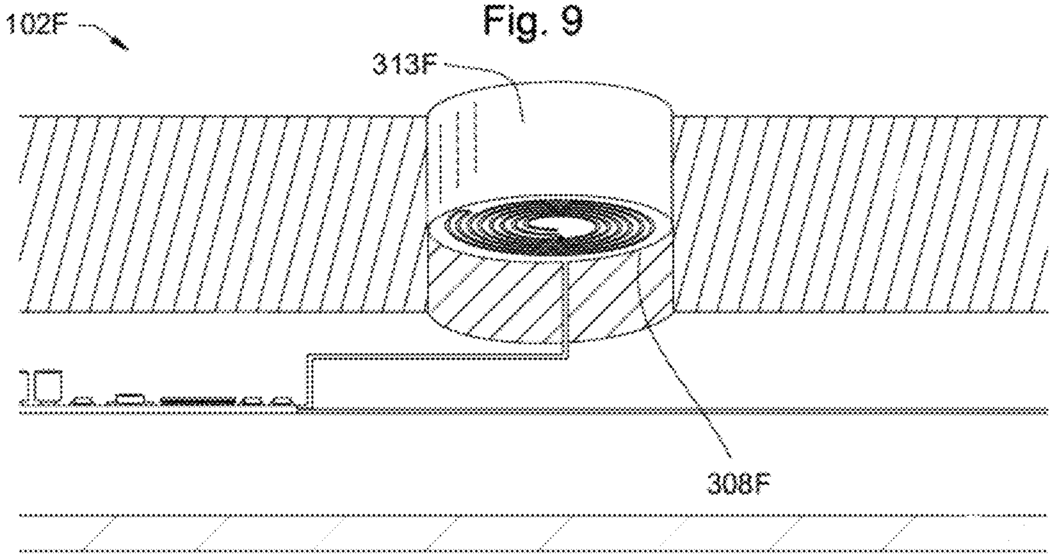
FIG. 10 is a cross sectional diagram of another embodiment of a downhole tool string component having an electrical device connected to a processing unit.

FIG. 10 is a cross sectional view of the embodiment of the tool string component 102F of FIG. 9 illustrating the pattern of the embodiment of FIG. 9 seated in the bottom of the blind-hole 313F on a seating surface 308F, the electrical device 301F is not shown for illustrative purposes.

Figure 11:
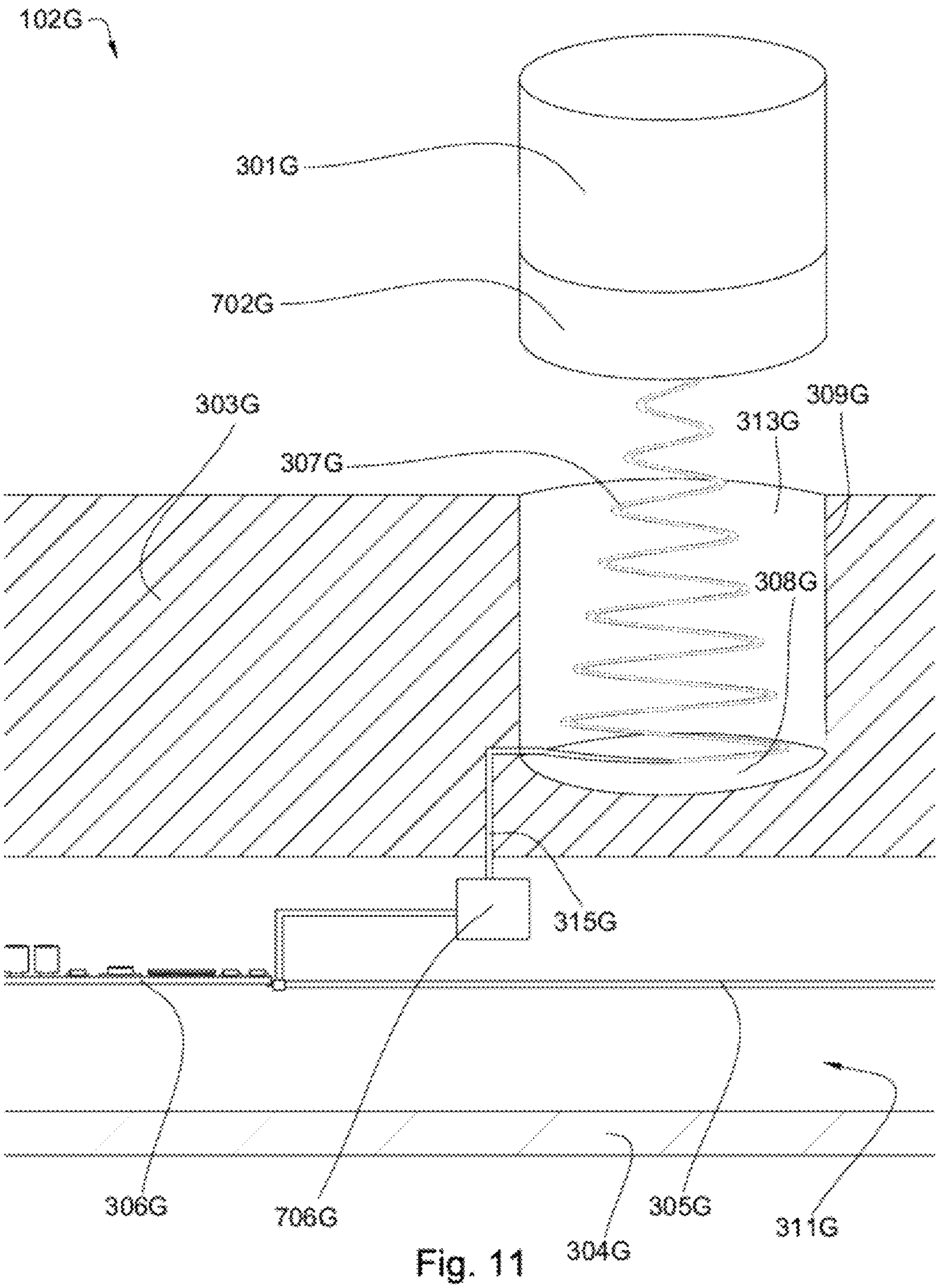
FIG. 11 is a cross sectional diagram of another embodiment of a downhole tool string component having an optical output electrical device connected to a processing unit.

FIG. 11 is a cross-sectional view of a tool string component 102G having an embodiment of an electrical device 301G with a battery power source 702G in optical communication with a processing unit 306G through an optically conductive medium 307G having a self-aligning pattern and an optical to electric converter 706G. The conductive material may travel through a port 315G in a bottom 308G or a wall 309G of a blind-hole 313G. The optically conductive medium 307G may be made from any material with optically conductive properties which has been disposed within a flexible material. The optical to electric converter 706G may be of a type similar to model J730 sold by Highland Technology located at 18 Otis Street, San Francisco, Calif. 94103. The processing unit 306G may be disposed within a pocket 311G between a sleeve 303G and a tubular body 304G. A drill string telemetry system 305G may also be disposed within the pocket 311G.

Figure 12:
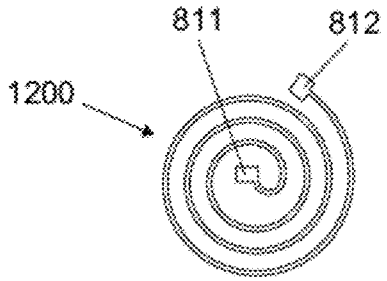
FIG. 12 is an orthogonal diagram of an embodiment of a self-aligning pattern.
Figure 13:
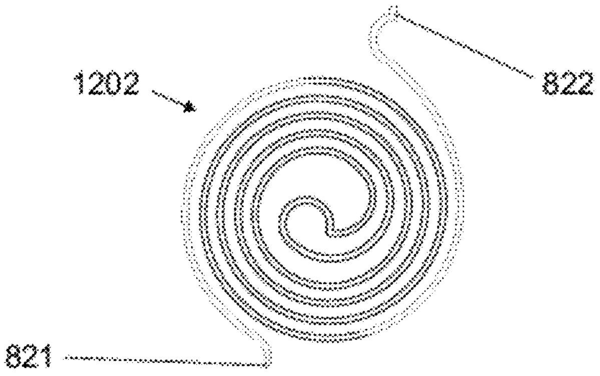
FIG. 13 is an orthogonal diagram of another embodiment of a self-aligning pattern.
Figure 14:
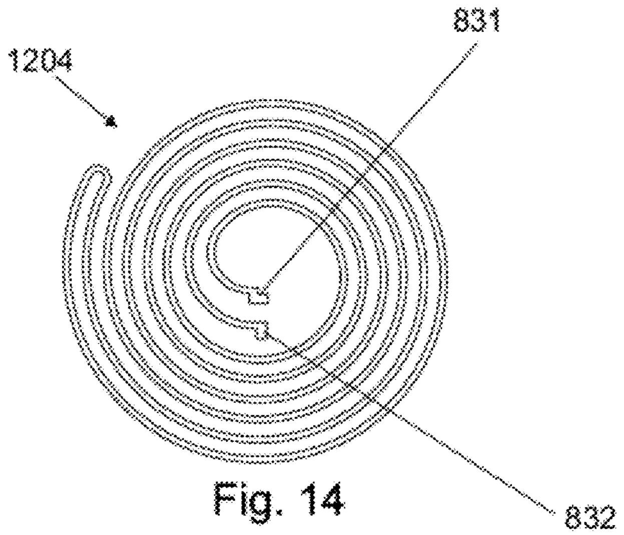
FIG. 14 is an orthogonal diagram of another embodiment of a self-aligning pattern.

FIGS. 12, 13, and 14 are orthogonal views of various embodiments of spiral self-aligning patterns. FIG. 12 depicts a spiral pattern 1200 with a first end 811 in an approximate center of the spiral pattern 1200 and a second end 812 on a periphery of the spiral pattern 1200. FIG. 13 is a spiral pattern 1202 with both a first end 822 and a second end 821 on a periphery of the spiral pattern 1202. FIG. 14 is a spiral pattern 1204 with both a first end 831 and a second end 832 in an approximate center of the spiral pattern 1204.

Figure 15:
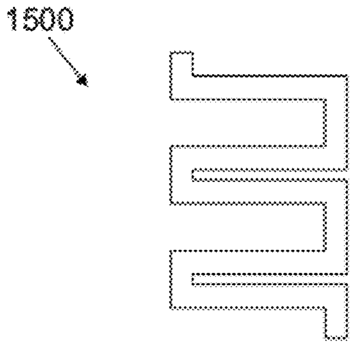
FIG. 15 is an orthogonal diagram of another embodiment of a self-aligning pattern.
Figure 16:
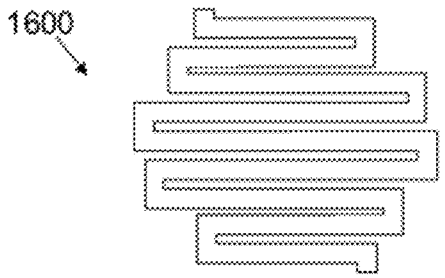
FIG. 16 is an orthogonal diagram of another embodiment of a self-aligning pattern.
Figure 17:
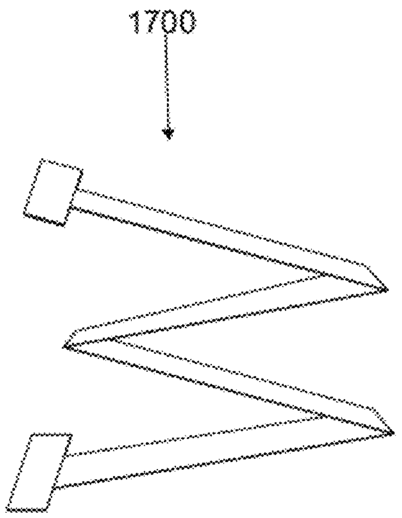
FIG. 17 is an orthogonal diagram of another embodiment of a self-aligning pattern.

FIGS. 15, 16, and 17 are other embodiments of self-aligning patterns. FIG. 15 illustrates a self-aligning pattern 1500 that takes on an overall square shape. FIG. 16 illustrates a self-aligning pattern 1600 that takes on an overall circular shape. Each of the shapes of the self-aligning patterns may be best suited for a respectively similar blind-hole shape. FIG. 17 is an embodiment of a self-aligning shape 1700 having a zigzag pattern.

Figure 18:
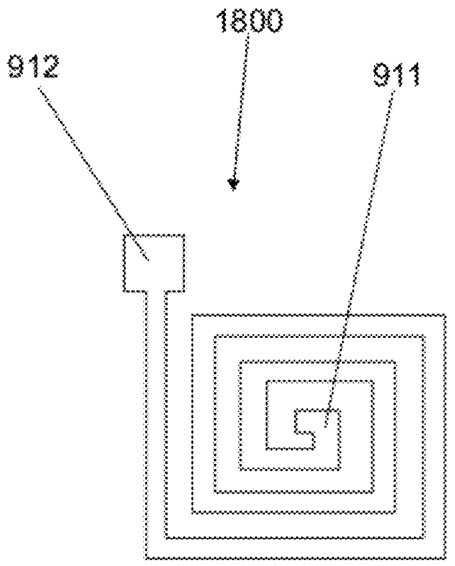
FIG. 18 is an orthogonal diagram of another embodiment of a self-aligning pattern.
Figure 19:
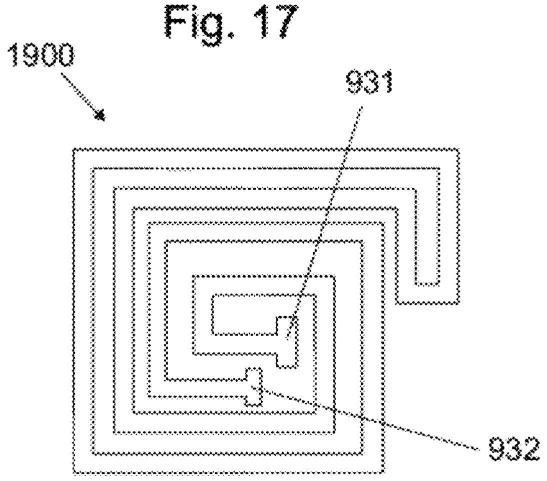
FIG. 19 is an orthogonal diagram of another embodiment of a self-aligning pattern.
Figure 20:
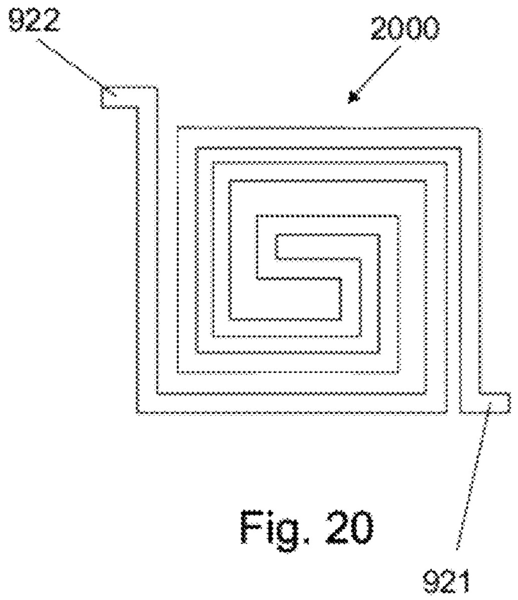
FIG. 20 is an orthogonal diagram of another embodiment of a self-aligning pattern.

FIGS. 18, 19, and 20 are orthogonal views of various embodiments of square spiral self-aligning patterns. FIG. 18 depicts a square spiral self-aligning pattern 1800 with a first end 911 in an approximate center of the square spiral self-aligning pattern 1800 and a second end 912 on the periphery of the square spiral self-aligning pattern 1800. FIG. 19 is a square spiral self-aligning pattern 1900 with both a first end 931 and a second end 932 in the approximate center of the square spiral self-aligning pattern. FIG. 20 is a square spiral self-aligning pattern 2000 with both a first end 922 and a second end 921 on a periphery of the square spiral self-aligning pattern 2000.

Figure 21:
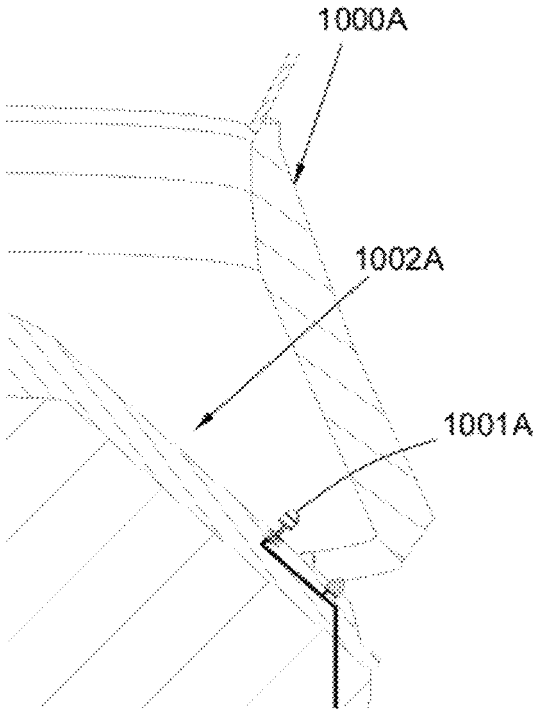
FIG. 21 is a cross sectional diagram of an embodiment of a cone crusher.
Figure 22:
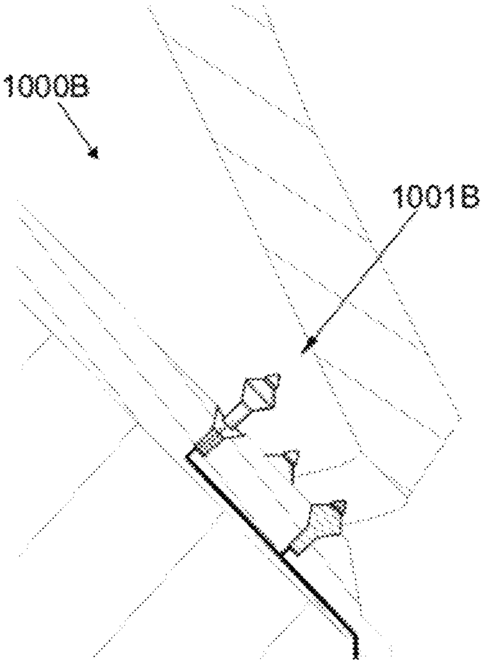
FIG. 22 is a cross sectional diagram of another embodiment of a cone crusher.

FIG. 21 is a cross sectional diagram of a cone crusher 1000A. In this embodiment, an electrical device is connected to a hard insert 1001A which is press fit into a blind hole formed in the crushing surface 1002 of the cone crusher 1000A. An electrically or optically conducting medium with a self-aligning pattern connects the electrical device with a processing unit disposed in the cone crusher 1000A. FIG. 22 discloses an embodiment of a cone crusher 1000B similar to FIG. 21, but with a tapered insert 1001B.

Figure 23:
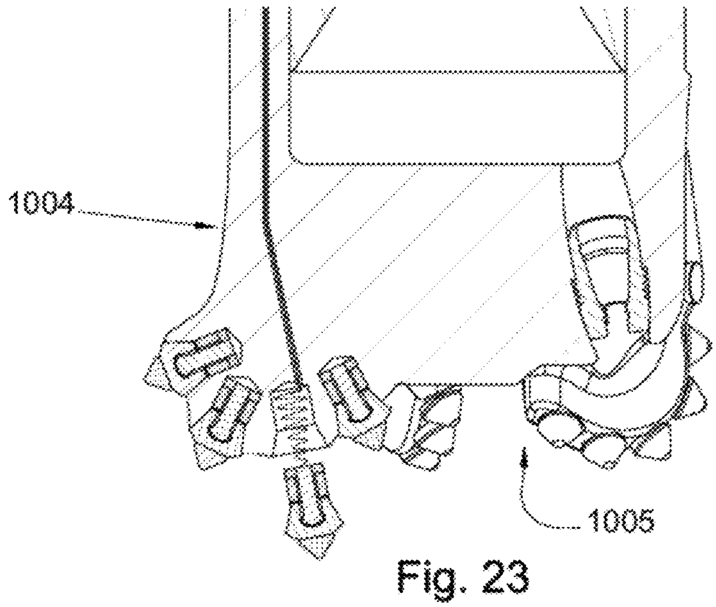
FIG. 23 is a cross sectional diagram of an embodiment of a drill bit.

FIG. 23 illustrates a drill bit 1004 with an electrical device press fit into it working surface 1005. An electrically or optically conducting medium with a self-aligning pattern also connects the electrical device to a processing unit. The processing unit may be disposes within the drill bit 1004, in the drill string, or over downhole telemetry system such as a downhole network. A suitable downhole network that may be compatible with the present invention is disclosed in U.S. Pat. No. 6,670,880 to Hall, et al., which is herein incorporated by reference for all that it discloses. The electrical device may measure the formation hardness or pressure. In some embodiments a single drilling insert incorporates an electrical device. In other embodiments, multiple inserts incorporate electrical devices.

Figure 24:
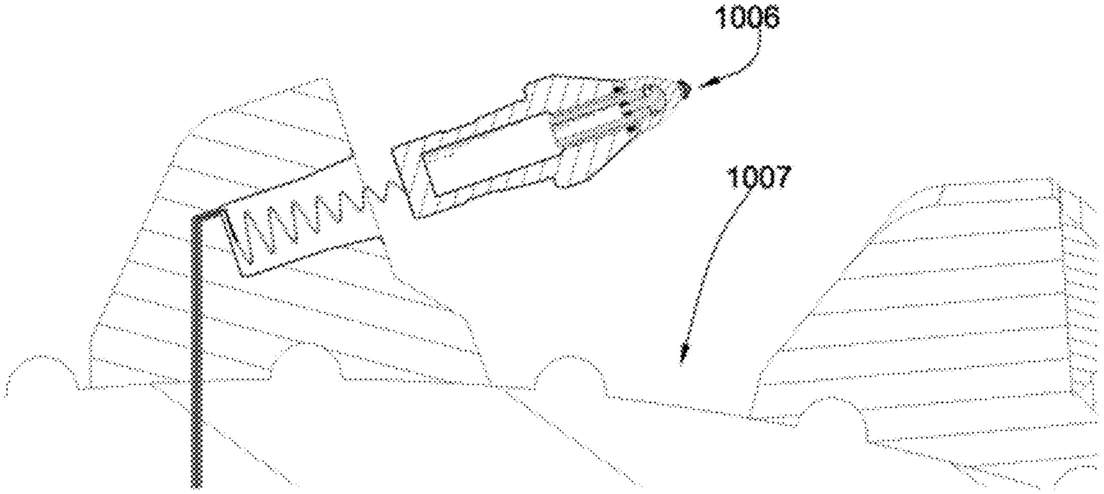
FIG. 24 is a cross sectional diagram of an embodiment of a milling drum.

FIG. 24 illustrates a pick 1006 for a mining or milling drum 1007 incorporated with an electrical device. The electrical device is connected with a processing element through an electrically or optically conductive medium having a self-aligning pattern.

Figure 25:
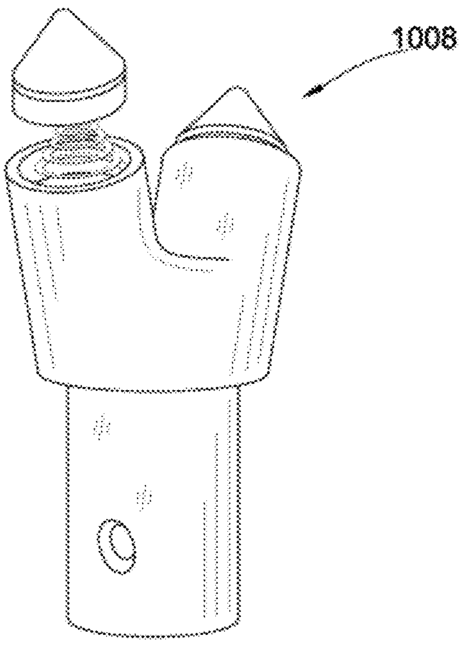
FIG. 25 is a cross sectional diagram of another embodiment of a drill bit.

FIG. 25 illustrates an embodiment of another drill bit 1008 with an electrical device incorporated into an insert.

Whereas the present invention has been described in particular relation to the drawings attached hereto, it should be understood that other and further modifications apart from those shown or suggested herein, may be made within the scope and spirit of the present invention.

What is claimed is:

1. A downhole tool string component, comprising:

a tubular body having a first tool joint adapted for connection to a first adjacent tool string component, a second tool joint spaced apart from the first tool joint and adapted for connection to a second adjacent tool string component, and a through-bore extending from the first tool joint to the second tool joint;

a sleeve disposed about the tubular body, the sleeve having an outer surface with a blind-hole formed therein;

a processing unit disposed between the outer surface and the tubular body;

an electronic device disposed in the blind hole; and a conductive medium selected from the group consisting of an electrically conductive medium and an optically conductive medium, the conductive medium coupling the electronic device with the processing unit, the conductive medium having a self-aligning pattern having a periphery and a center, wherein the periphery is adapted to seat prior to the center when the electronic device is inserted into the blind-hole and the conductive medium couples the electronic device and the processing unit.

2. The downhole tool string component of claim 1, wherein the self-aligning pattern has a first end and a second end.

3. The downhole tool string component of claim 2, wherein the first end and the second end are located in an approximate center of the self-aligning pattern.

4. The downhole tool string component of claim 1, wherein the electrical device is attached to an approximate center of the self-aligning pattern.

5. The downhole tool string component of claim 1, wherein the self-aligning pattern comprises a spiral.

6. The downhole tool string component of claim 1, wherein the electrical device is press fit into the blind-hole.

7. The downhole tool string component of claim 1, wherein outer surface of the sleeve is adapted to face a borehole wall.

8. A structure, comprising:

a body having a wall defining an outer surface and an inner bore;

a blind-hole formed in the wall on the outer surface;

an electrical device disposed within the blind-hole;

a processing unit disposed within the inner bore and in at least one of electrical communication and optical communication with the electrical device through a conductive medium having a self-aligning pattern with a periphery and a center, wherein the periphery is adapted to seat prior to the center when the electrical device is inserted into the blind-hole and the conductive medium couples the electrical device and the processing unit.

* * * * *